US008407193B2

(12) United States Patent
Gruhl et al.

(10) Patent No.: US 8,407,193 B2
(45) Date of Patent: Mar. 26, 2013

(54) DATA DEDUPLICATION FOR STREAMING SEQUENTIAL DATA STORAGE APPLICATIONS

(75) Inventors: Daniel F. Gruhl, San Jose, CA (US); Jan H. Pieper, San Jose, CA (US); Mark A. Smith, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 12/695,127

(22) Filed: Jan. 27, 2010

(65) Prior Publication Data

US 2011/0185149 A1 Jul. 28, 2011

(51) Int. Cl.
G06F 17/00 (2006.01)
(52) U.S. Cl. ........................................ 707/693; 707/698
(58) Field of Classification Search .................. 707/664, 707/692, 690, 693, 698
See application file for complete search history.

(56) References Cited

U.S. PATENT DOCUMENTS

| 4,215,402 A | 7/1980 | Mitchell et al. |
| 5,627,748 A | 5/1997 | Baker et al. |
| 5,990,810 A | 11/1999 | Williams |
| 7,200,604 B2 | 4/2007 | Forman et al. |
| 7,504,969 B2 | 3/2009 | Patterson et al. |
| 7,519,635 B1 | 4/2009 | Haustein et al. |
| 7,814,149 B1 | 10/2010 | Stringham |
| 7,844,581 B2 | 11/2010 | Dubnicki |
| 7,937,371 B2 * | 5/2011 | Bates et al. .................. 707/661 |
| 7,992,037 B2 | 8/2011 | Dubnicki et al. |
| 8,108,353 B2 | 1/2012 | Balachandran et al. |
| 8,140,491 B2 | 3/2012 | Mandagere et al. |
| 2002/0123995 A1 | 9/2002 | Shibuya |
| 2006/0059207 A1 | 3/2006 | Hirsch |
| 2007/0177739 A1 | 8/2007 | Ganguly et al. |
| 2007/0255758 A1 | 11/2007 | Zheng et al. |
| 2008/0034268 A1 | 2/2008 | Moore et al. |
| 2008/0133561 A1 | 6/2008 | Dubnicki et al. |
| 2008/0294696 A1 * | 11/2008 | Frandzel ........................ 707/200 |
| 2009/0013129 A1 * | 1/2009 | Bondurant ..................... 711/115 |
| 2009/0177855 A1 | 7/2009 | Drews et al. |
| 2009/0182789 A1 | 7/2009 | Sandorfi et al. |

(Continued)

OTHER PUBLICATIONS

NEC Corporation, HYDRAstor: New Architecture for Disk-based Backup, GlassHouse Whitepaper, 2007, pp. 1-15.; http://www.nec.co.jp/products/istorage/whitepaper/file/hydra_backup.pdf, Glass House Technologies, Inc., United States. (15).

(Continued)

Primary Examiner — Kimberly Wilson
Assistant Examiner — Hau H Hoang
(74) Attorney, Agent, or Firm — Kenneth L. Sherman, Esq.; Michael Zarrabian, Esq.; Sherman & Zarrabian LLP

(57) ABSTRACT

Data deduplication compression in a streaming storage application, is provided. The disclosed deduplication process provides a deduplication archive that enables storage of the archive to, and extraction from, a streaming storage medium. One implementation involves compressing fully sequential data stored in a data repository to a sequential streaming storage, by: splitting fully sequential data into data blocks; hashing content of each data block and comparing each hash to an in-memory lookup table for a match, the in-memory lookup table storing all hashes that have been encountered during the compression of the fully sequential data; for each data block without a hash match, adding the data block as a new data block for compression of fully sequential data; and encoding duplicate data blocks using the in-memory lookup table into data segments.

17 Claims, 8 Drawing Sheets

U.S. PATENT DOCUMENTS

| | | | |
|---|---|---|---|
| 2009/0204636 | A1 | 8/2009 | Li et al. |
| 2009/0228680 | A1 | 9/2009 | Reddy et al. |
| 2009/0276454 | A1 | 11/2009 | Smith |
| 2010/0088296 | A1 | 4/2010 | Periyagaram et al. |
| 2010/0153375 | A1 | 6/2010 | Bilas et al. |
| 2010/0198797 | A1 | 8/2010 | Wideman |
| 2010/0281207 | A1* | 11/2010 | Miller et al. .................. 711/103 |
| 2010/0306412 | A1 | 12/2010 | Therrien et al. |
| 2011/0099351 | A1 | 4/2011 | Condict |

OTHER PUBLICATIONS

Broder, A. Z., "Identifying and Filtering Near-Duplicate Documents". Combinatorial Pattern Matching: 11th Annual Symposium, 2000, pp. 1-10, Springer-Berlag, Berlin, Germany.

Douglis, F. et al., "Application-specific Delta-encoding via Resemblance Detection". USENIX Annual Technical Conference, 2003, pp. 1-14, United States.

MacDonald, J., "File System Support for Delta Compression". Master's thesis, University of California, Berkley, 2000, pp. 1-32, United States.

MacDonald, J. et al., "The VCDIFF Generic Differencing and Compression Data Format", Internet-Draft, Nov. 9, 2001, pp. 1-29, United States.

U.S. Non-Final Office Action for U.S. Appl. No. 12/137,462 mailed Nov. 16, 2010.

U.S. Final Office Action for U.S. Appl. No. 12/137,462 mailed May 12, 2011.

U.S. Notice of Allowance for U.S. Appl. No. 12/137,462 mailed Sep. 29, 2011.

U.S. Non-Final Office Action for U.S. Appl. No. 12/411,902 mailed Jul. 28, 2011.

International Search Report and Written Opinion dated Apr. 8, 2011 for International Application No. PCT/EP2011/050143 from European Patent Office, filed Jan. 7, 2011, pp. 1-7, Rijswijk, Netherlands.

Constantinescu, C., "Compression for Data Archiving and Backup Revisited," Proceedings of SPIE, vol. 7444, SPIE, 2009, pp. 74440C-1-74440C-12, United States.

Meister, D. et al., "Multi-Level Comparison of Data Deduplication in a Backup Scenario," Proceedings of SYSTOR 2009: The Israeli Experimental Systems Conference, ACM, 2009, pp. 1-12, New York, United States.

B. Zhu, et al., "Avoiding the disk bottleneck in the data domain deduplication file system," USENIX Conference on File and Storage Technologies, FAST '08: 6th, 2008, pp. 269-282, United States.

Data Domain, Data domain SISL, Scalability Architecture, Technical report, May 2007, pp. 1-6, Santa Clara, CA, United States.

S. Balachandran, et al., "Sequence of hashes compression in data de-duplication," 2008 Data Compression Conference, Mar. 2008, (Abstract only), United States.

Tridgell, J.M. Andrew, xdelta, downloaded at: http://xdelta.org/, 2008, printed Oct. 30, 2009, 21 pages, United States.

Barham P., et al., "Xen and the Art of Virtualization", Proceedings of the 19th ACM symposium on Operating Systems Principles (SOSP '03), Oct. 2003, pp. 164-177, ACM Press, New York, United States.

Clark, B. et al., "Xen and the Art of Repeated Research", USENIX Annual Technical Conference, FREENIX Track, 2004, pp. 135-144, United States.

Gilmore, J., "Tar-GNU Project—Free Software Foundation (FSF)", located at: http://www.gnu.org/software/tar/, 2008, printed Oct. 30, 2009, 10 pages, United States.

Hitz, D, et al., "File System Design for an NFS File Server Appliance," 1994 Winter USENIX, 1994, pp. 235-246, United States.

Gailly, J. and Adler, M., "The GZIP home page," downloaded at: http://www.gzip.org/, 2004, printed Oct. 30, 2009, 9 pages, United States.

Kolivas, C., "Long Range ZIP or Lzma RZIP," downloaded at: http://ck.kolivas.org/apps/lrzip/README, Mar. 2008, printed Oct. 30, 2009, 7 pages, United States.

Kulkarni, P. et al., "Redundancy Elimination Within Large Collections of Files", In USENIX Annual Technical Conference, 2004, pp. 59-72, United States.

Alvarez, C., "NetApp Deduplication for FAS and V-Series Deployment and Implementation Guide", NetApp Technical Report TR-3505-0309, Mar. 2009, pp. 1-40, United States.

Park, K. et al., "Supporting Practical Content-Addressable Caching with CZIP Compression", In USENIX 2007 Annual Technical Conference, 2007, pp. 185-198, United States.

Policroniades, C. et al., "Alternatives for Detecting Redundancy in Storage Systems Data", Proceedings of the USENIX Annual Technical Conference, Jun. 2004, pp. 73-86, United Kingdom.

Primmer, R. et al., "Collision and Preimage Resistance of the Centera Content Address", EMC Corporation Technical Report, Jun. 2005, pp. 1-10, United States.

Quinlan, S. et al., "Venti: a new approach to archival storage", FAST 2002 Conference on File and Storage Technologies, Jan. 2002, pp. 89-102, United States.

Rabin, M. O., "Fingerprinting by Random Polynomials", Center for Research in Computing Technology, Harvard University, Technical Report TR-15-81, 1981, pp. 1-12, United States.

Reed, B. et al., "Security Considerations When Designing a Distributed File System Using Object Storage Devices", IEEE Security in Storage Workshop, Dec. 2002, pp. 24-34, United States.

Rosenblum, M., et al., "Virtual Machine Monitors: Current Technology and Future Trends", Computer, May 2005, pp. 39-47, vol. 38, No. 5, IEEE Computer Society, United States.

Seward, J., "bzip2 and libbzip2", downloaded at: http://www.bzip.org/, 2007, printed Nov. 2, 2009, 1 page, United States.

Smith, J.E,. et al., "The Architecture of Virtual Machines", Computer, May 2005, pp. 32-38, vol. 38, No. 5, IEEE Computer Society, United States.

Sugerman, J., et al., "Virtualizing I/O Devices on VMware Workstation's Hosted Virtual Machine Monitor", USENIX Annual Technical Conference, General Track, Jun. 2001, pp. 1-15, United States.

Tang, J.C., et al., "Exploring Patterns of Social Commonality Among File Directories at Work", Proceedings of the SIGCHI conference, Apr.-May 2007, pp. 951-960, ACM, United States.

Tridgell, A., "Efficient Algorithms for Sorting and Synchronization", PhD Thesis, The Australian National University, Feb. 1999, pp. 1-115, Australia.

Tridgell, A., "rzip", downloaded at: http://rzip.samba.org/, 2004, printed Nov. 2, 2009, 3 pages, United States.

Villanueva, B., et al., "Providing Students 24/7 Virtual Access and Hands-On Training using VMware GSX Server", Proceedings of the 33rd Annual ACM SIGUCCS Conference on User Services, Nov. 2005, pp. 421-425, United States.

Waldspurger, C.A., "Memory Resource Management in VMware ESX Server", USENIX Association, Proceedings of 5th Symposium on Operating Systems Design, Dec. 2002, pp. 181-194, vol. 36, No. SI, United States.

Whitaker, A., et al., "Rethinking the Design of Virtual Machine Monitors", Computer, May 2005, pp. 57-62, vol. 38, No. 5, IEEE Computer Society, United States.

You, L., et al., "Evaluation of Efficient Archival Storage Techniques", 21st IEEE/12th NASA Goddard Conference on Mass Storage Systems and Technologies, Apr. 2004, pp. 227-232, United States.

You, L., et al., "Deep Store: An Archival Storage System Architecture", 21st International Conference on Data Engineering (ICDE'05), 2005, pp. 804-815, IEEE Computer Society, United States.

wikipedia.org, "gzip", downloaded from: http://en.wikipedia.org/wiki/Gzip, download date: May 27, 2009, 3 pages, United States.

wikipedia.org, "rzip", downloaded from: http://en.wikipedia.org/wiki/Rzip, download date: May 27, 2009, 3 pages, United States.

M. A. Smith, et al., "IZO: Applications of Large-Window Compression to Virtual Machine Management," 22nd Large Installation System Administration Conference (LISA '08), Nov. 2008, pp. 121-132, United States.

U.S. Notice of Allowance for U.S. Appl. No. 12/411,902 mailed on Nov. 15, 2011.

* cited by examiner

DATA DEDUPLICATION FOR STREAMING SEQUENTIAL DATA STORAGE APPLICATIONS

BACKGROUND

1. Field of the Invention

The present invention relates generally to data storage. In particular, the present invention relates to data deduplication for streaming sequential data storage applications.

2. Background of the Invention

In information technology environments comprising computing systems, data storage systems and networks, long term storage and archiving techniques often involve data storage best accessed as a stream. For example, tape drive data storage systems require sequential read and write of data archives. Techniques such as the UNIX™ utility "tar" and Windows® "zip" utility have been designed with this sequential access restriction in mind. Such techniques package a set of files and directories from random access storage (such as hard disk drives) into a single archive stream. Similarly, such techniques can process an existing archive as an input stream (e.g., reading from tape) and then write the individual files back onto a hard disk drive.

Data deduplication compresses data by identifying these stretches of duplicate data and replacing them with references to a single copy of the unique data. Conventional deduplication systems comprise random access hardware, showing their storage area network (SAN) and network attached storage (NAS) lineage. These deduplication systems employ tables of unique or quasi-unique content hashes to identify what unique data blocks are known in the data stream. Such tables reference the data block in the compressed data set. This has the effect of requiring random seeks of the compressed data during the decompression process, which does not match sequential access operation of sequential storage hardware such as tape drives.

BRIEF SUMMARY

A method for data deduplication compression in a streaming storage application, is provided. The disclosed deduplication process provides a deduplication archive that enables storage of the archive to, and extraction from, a streaming storage medium. One embodiment comprises compressing fully sequential data stored in a data repository to a sequential streaming storage. Fully sequential data is split into data blocks. Content of each data block is hashed and each hash is compared to an in-memory lookup table for a match. The in-memory lookup table stores all hashes that have been encountered during the compression of the fully sequential data. For each data block without a hash match, the data block is added as a new data block for compression of fully sequential data. Duplicate data blocks are then encoded using the in-memory lookup table into data segments.

Another embodiment comprises a data deduplication compression system for a streaming storage application comprising a deduplication module configured for compressing fully sequential data stored in a data repository to a sequential streaming storage. The deduplication module comprises a deduplication compression module configured for splitting fully sequential data into data blocks and hashing content of each data block and comparing each hash to an in-memory lookup table for a match, the in-memory lookup table storing all hashes that have been encountered during the compression of the fully sequential data. The deduplication compression module is further configured for, for each data block without a hash match, adding the data block as a new data block for compression of fully sequential data, and encoding duplicate data blocks using the in-memory lookup table into data segments.

Another embodiment comprises a computer program product for data deduplication compression in a streaming storage application, the computer program product comprising a computer readable storage medium having computer readable program code embodied therewith. The computer readable program when executed on the computer causes the computer to provide a deduplication archive that enables storage of the archive to, and extraction from, a streaming storage medium by compressing fully sequential data stored in a data repository to a sequential streaming storage. The computer readable program when executed on the computer causes the computer to performing deduplication compression by splitting fully sequential data into data blocks and hashing content of each data block and comparing each hash to an in-memory lookup table for a match, the in-memory lookup table storing all hashes that have been encountered during the compression of the fully sequential data. Deduplication compression further comprises, for each data block without a hash match, adding the data block as a new data block for compression of fully sequential data, and encoding duplicate data blocks using the in-memory lookup table into data segments.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. The description may disclose several preferred embodiments for information technology data storage. While the following description will be described in terms of such languages for clarity and placing the invention in context, it should be kept in mind that the teachings herein may have broad application to all types of systems, devices and applications.

A data deduplication process for streaming data storage applications, is disclosed. Large data sets often contain long stretches of duplicate bytes. Data deduplication compresses data by identifying these stretches of duplicate data and replacing them with references to a single copy of the unique data. As a result, high compression factors of e.g., about 10:1 or more may be achieved.

Figure 1:
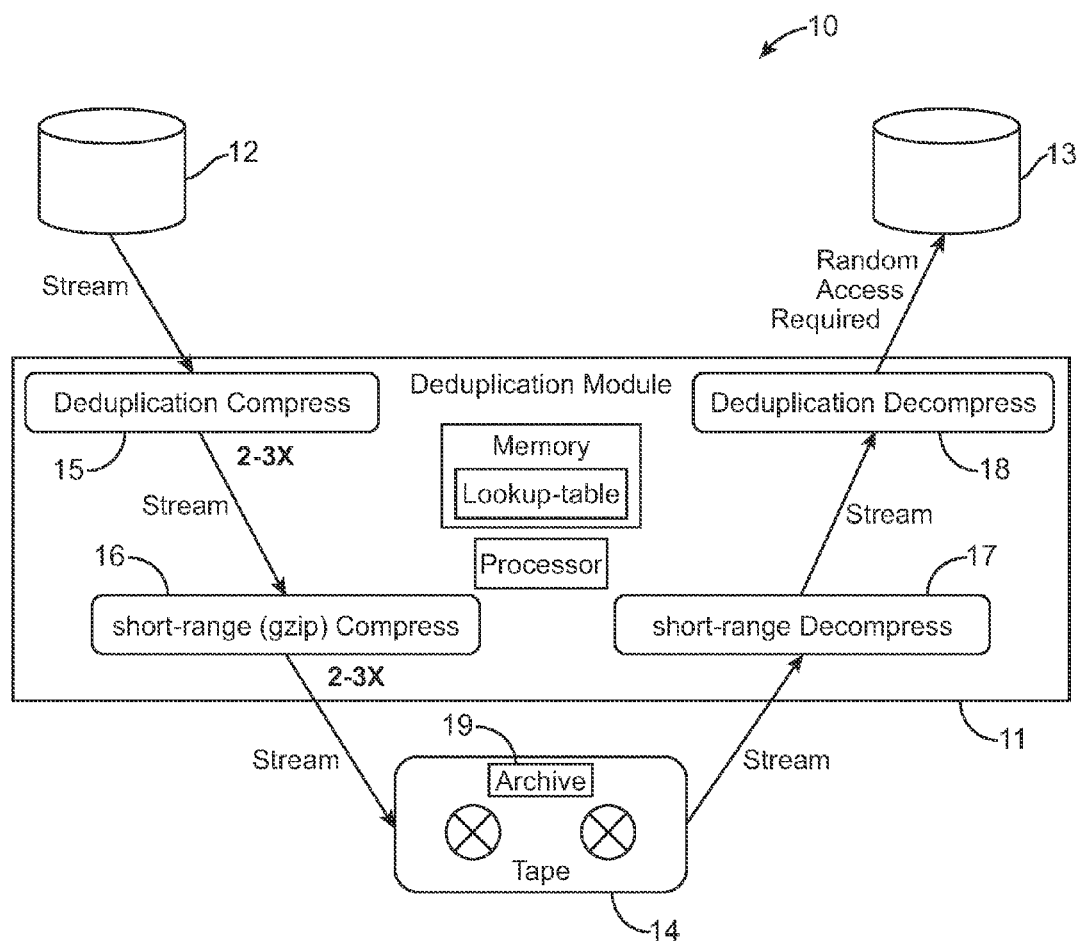
FIG. 1 shows architecture of an embodiment of a deduplication for streaming sequential data storage applications.

The disclosed deduplication process provides a deduplication archive that enables storage of the archive to, and extraction from, a streaming storage medium (e.g., tape). The deduplication process streams a compressed archive from sequential storage (e.g., tape drive) and seamlessly decompresses it to random access storage (e.g., disk drive), as shown in FIG. 1, illustrating a system 10 for data deduplication for streaming applications. The system 10 comprises a deduplication module 11, random access storage modules 12, 13 (e.g., hard disk, optical medium) of data repositories, and a streaming sequential storage module 14 (e.g., tape). The deduplication module 11 comprises a deduplication compress module 15, a short-range compress module 16, a short-range decompress module 17 and a deduplication decompress module 18. The deduplication process generates a deduplication archive 19 that enables storage of the archive to, and extraction from, the streaming sequential storage module 14.

Figure 2A:
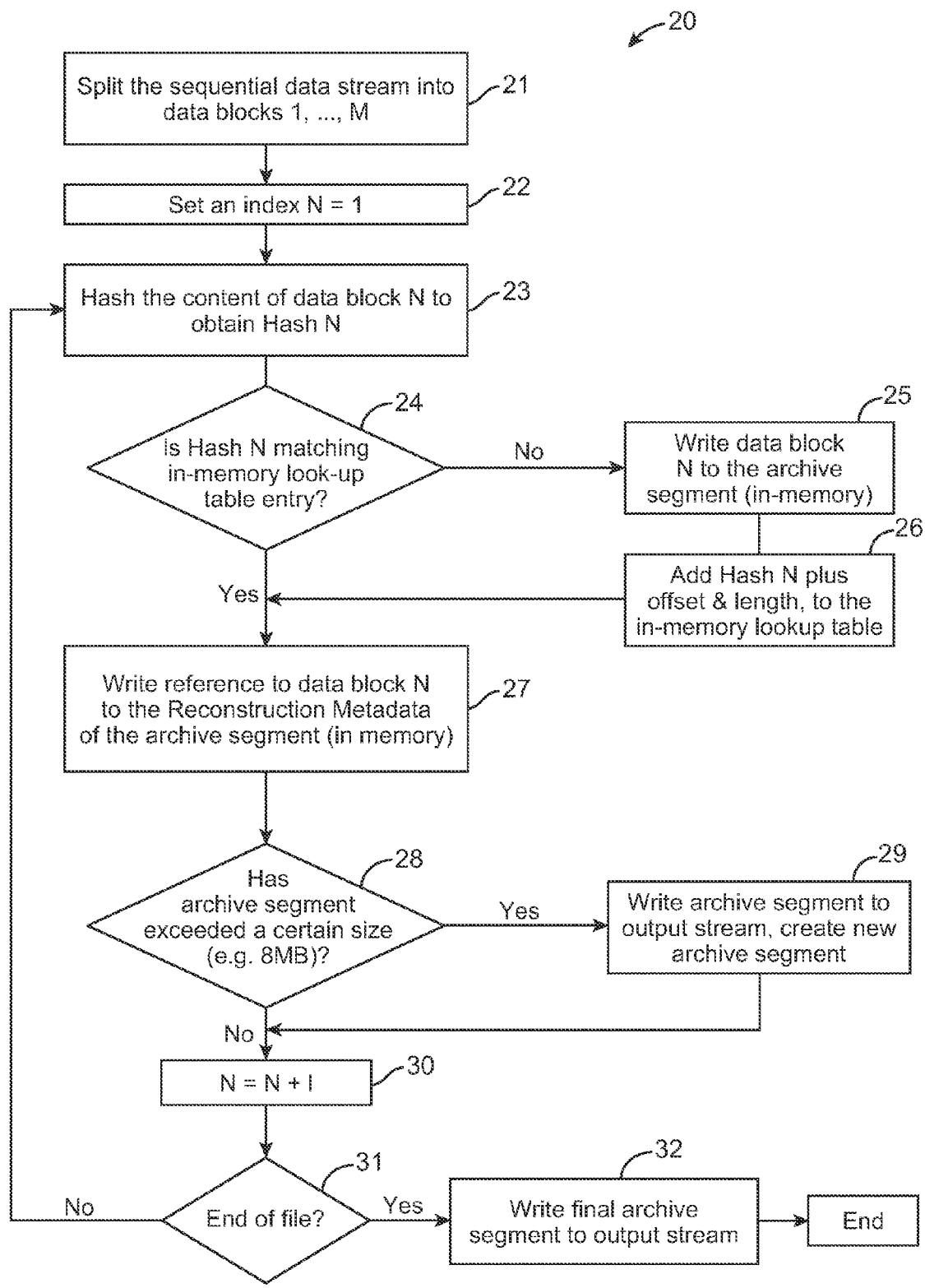
FIGS. 2A-D show processes for deduplication for streaming sequential data storage applications.

FIGS. 2A-D show an embodiment of the deduplication process implemented by the deduplication module 11. Referring to FIG. 2A, a deduplication compression phase 20 implemented by the deduplication compress module 15 comprises compressing data stored in a data repository from a random access storage (i.e., simple sequential store), by:

Block 21: Splitting the sequential data stored in a data repository, into data M blocks (i.e., chunks) 1, ..., M.

Block 22: Set a block counting index N=1, where N can range from 1 to M.

Block 23: Hashing content of data block N to obtain Hash N.

Block 24: Comparing hash N to an in-memory lookup table. If there is no matching entry, proceed to block 25, else proceed to block 27.

Block 25: Writing data block N to the archive segment (in-memory).

Block 26: Add Hash N plus offset & length, to the in-memory lookup table. Proceed to block 27.

Block 27: Write reference to data block N to the Reconstruction Metadata of the archive segment (in memory).

Block 28: Has the archive segment exceeded a certain size (e.g., 8 MB)? If yes, proceed to block 29, else proceed to block 30.

Block 29: Write archive segment to output stream, create new archive segment. Proceed to block 30.

Block 30: Increment index N by one (i.e., N=N+1).

Block 31: End of file? If yes, proceed to block 32, else proceed back to block 23.

Block 32: Write final archive segment to output stream. End.

Figure 2B:
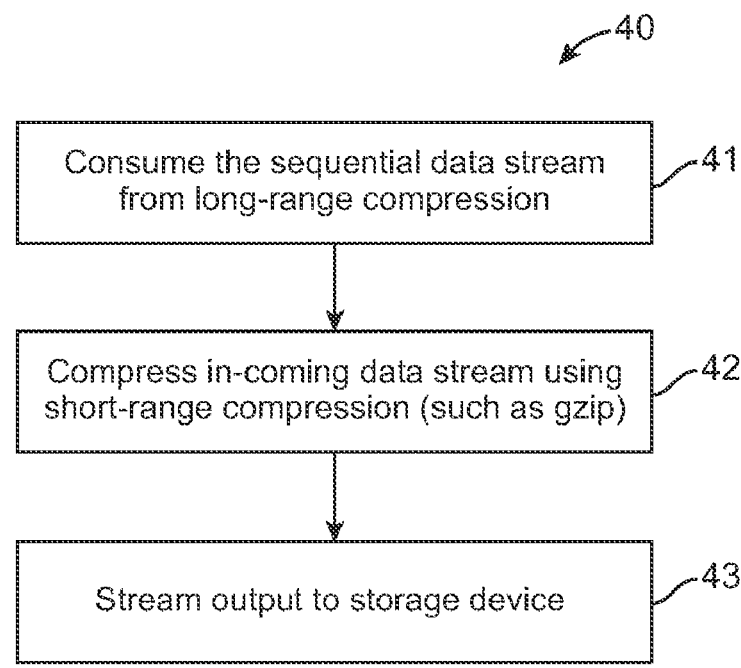

Referring to FIG. 2B, a short-range compression phase 40 implemented by the short-range compress module 16 comprises compressing data stored in the repository (i.e., application of gzip to the archive data stream, same for simple and complex store), by:

Block 41: Consume the sequential data stream from long-range compression.

Block 42: Compressing in-coming data stream using short-range compression (such as gzip).

Block 43: Streaming output to storage device.

Figure 2C:
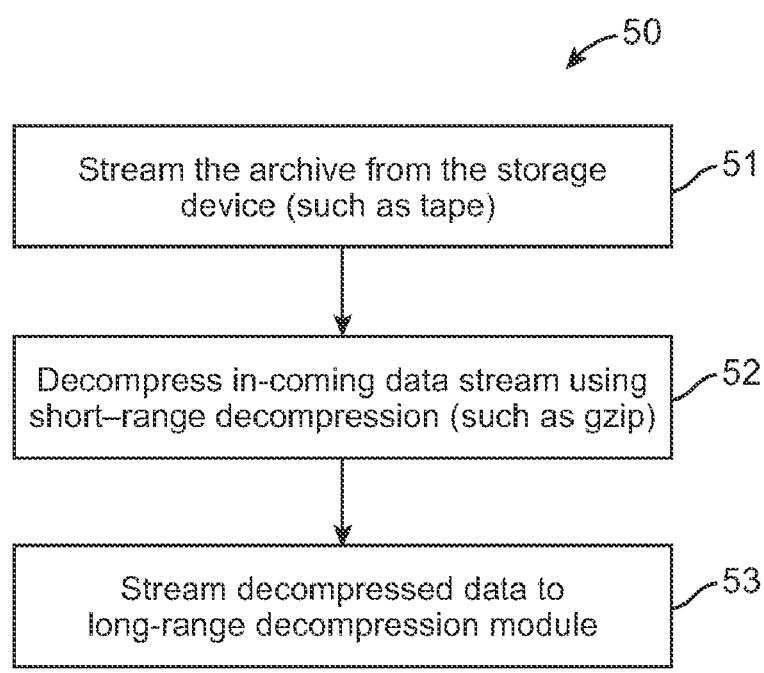

Referring to FIG. 2C, a short-range decompression phase 50 implemented by the short-range decompress module 17 comprises decompressing data stored on storage tape (i.e., short range (gzip) decompression of the archive, same for simple and complex retrieval), by:

Block 51: Streaming the archive from the storage device (such as tape).

Block 52: Decompressing in-coming data stream using short-range decompression (such as gzip).

Block 53: Streaming decompressed data to long-range decompression.

Figure 2D:
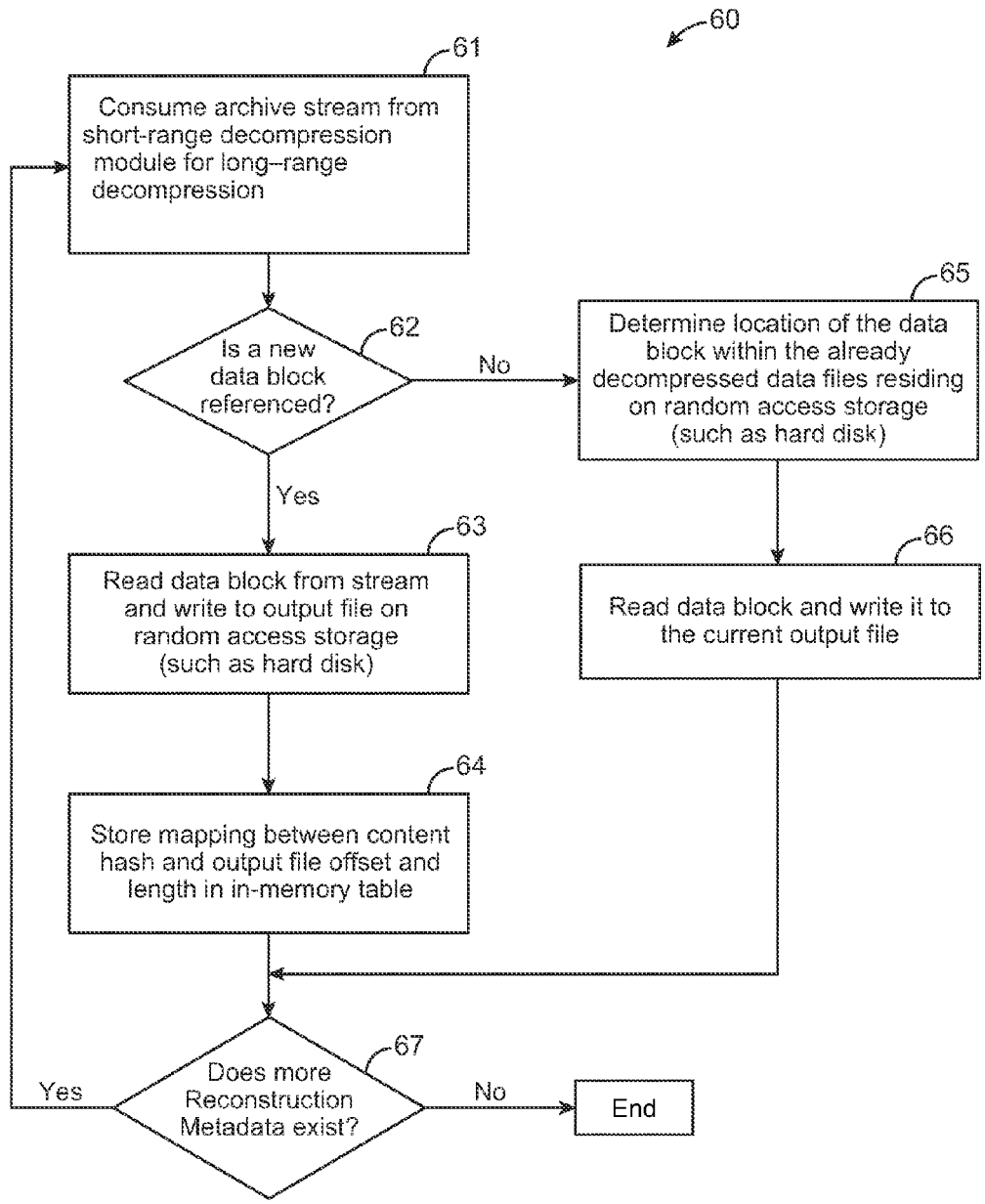

Referring to FIG. 2D a deduplication decompression phase 60 implemented by the deduplication decompress module 18 comprises decompressing data to data repository for streaming to sequential access storage (i.e., simple sequential retrieval case), by:

Block 61: Consume archive stream from short-range decompression for long-range decompression. Reconstruction Metadata always precedes new data blocks.

Block 62: Is a new data block referenced? If yes, proceed to block 63, else proceed to block 65.

Block 63: Reading data block from stream and writing to output file on random access storage (such as hard disk).

Block 64: Storing mapping between content hash and output file offset and length in in-memory table. Proceed to block 67.

Block 65: Determining location of the data block within the already decompressed data files residing on random access storage (such as hard disk).

Block 66: Reading data block and writing it to the current output file.

Proceed to block 67.

Block 67: Does more Reconstruction Metadata exist? If yes, proceed back to block 61, else, end.

Additional data may be appended to the data deduplication archive, wherein the in-memory lookup table is restored by reading the in-memory lookup table to identify data blocks in the additional data contained in the data deduplication archive. The in-memory lookup table is overwritten with the additional data. A new in-memory lookup table is stored to enable subsequent appending of additional data.

As such, in one example, new data blocks are added to the compression of the fully sequential data as the data becomes available. All hashes that have been encountered during the compression of the fully sequential data in the in-memory lookup table are stored. Duplicate data blocks are encoded into data segments (described further below), using the in-memory lookup table.

Partially sequential data and data from a randomly accessible storage stored in the data repository, is compressed to storage tape. Reconstruction metadata and an in-memory lookup table of the data is obtained from the randomly accessible storage. The reconstruction metadata and an in-memory lookup table, is stored in random access storage. The reconstruction metadata in the random accessible storage enables listing all files contained in a data deduplication archive without streaming through a storage tape, and the data block reference table in the random access storage enables acceleration of an append to the data deduplication archive.

The fully and partially sequential data stored on the storage tape, is decompressed to the data repository. Reconstruction metadata references previous data blocks and new data blocks. Previous data blocks are read and stored in a decompressed output, wherein the new data blocks contained in a current data segment.

The data from the randomly accessible storage stored on the storage tape, is decompressed to the data repository. The compressed data from the randomly accessible storage is scanned and decompressed. Apriori information is analyzed to determine when earlier data is going to be referenced, wherein the earlier data is not included in a partial decompression set.

One implementation of the disclosed deduplication process described hereinabove enables deduplication type data folding on sequential schemes. It differentiates between "simple streams" that are fully sequential and do not provide any random access at all, and "complex streams" where majority of the storage space is sequential, but a small fraction is randomly accessible. One example for complex streams is tape drives where the tape cartridge comprises a small amount of randomly accessible solid-state storage memory.

In this implementation, enabling data deduplication for streaming storage involves simple sequential store, simple sequential retrieval, complex sequential store and complex sequential retrieval. These together enable data deduplication compression in streaming storage applications. A level of indirection is introduced where output files are mapped to a number, and compression inline metadata is stored as file, offset, length triples instead of offset, length doubles.

A deduplication process provides a deduplication archive that enables storage of the archive to, and extraction from, a streaming medium (e.g., tape). The deduplication process disclosed herein considers both the case where the data storage medium comprises a simple sequential stream (potentially with seek ability) such as a sequential storage, as well as the case where sequential storage is paired with a random access device such as a small Random Access Store (RAS) typically <1% the size of the sequential storage.

Creation (Store) and decompression (Retrieval) of a deduplication archive on "Simple Streams" is considered first. Simple Streams comprise streams that are fully sequential (i.e., that do not allow any random access at all).

Simple Sequential Storage

A first data deduplication compression process compresses incoming data and provides an output stream similar to other compression tools (such as gzip or GNU zip, a software application for data compression, known to those skilled in the art). The process does not require re-read of data, because duplicate information is uniquely identified using cryptographically strong hash signatures, distinguishing the process from other long-range compression tools (such as rzip, which is a large scale data compression software, known to those skilled in the art).

Figure 3:
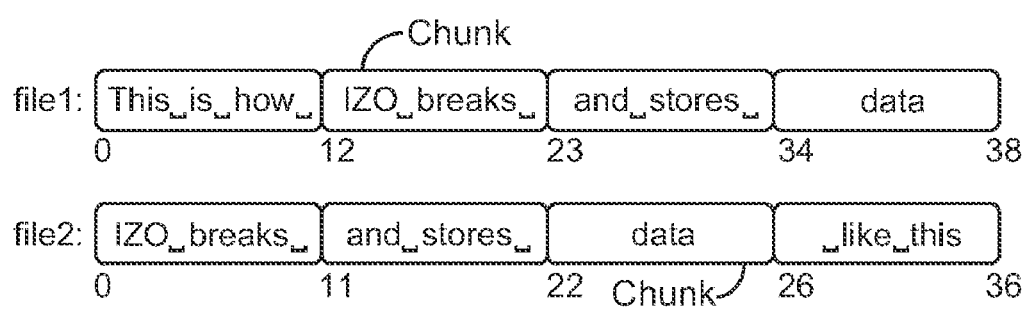
FIG. 3 shows an example of processing input data for deduplication for streaming sequential data storage applications.
Figure 4:
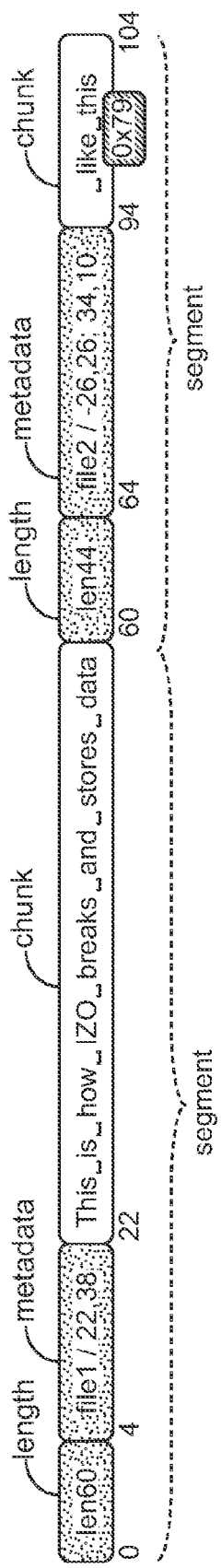
FIG. 4 shows an example of encoding data for deduplication for streaming sequential data storage applications.

In said process, the input data is split into data blocks (or "chunks"), either of fixed size or using heuristics such as Rabin fingerprinting as shown by example input files 1 and 2 in FIG. 3. The content of each chunk is then hashed and the hash is compared to an in-memory lookup structure storing all hashes that have been encountered during the compression so far. New chunks are added to the archive. Duplicate chunks are encoded by referencing the position and length of the original data chunk in the sequential data stream using the information from the hash lookup structure (look-up table), as shown by example in FIG. 4 which processes files 1 and 2 of FIG. 3. An implementation of a sequential store process involves an archive 19 (FIG. 1) which is created in segments based on information from input files. Each segment encodes the length of the segment, followed by reconstruction metadata, followed by unique chunk data as shown in FIG. 4. A segment remains in memory until it is completely prepared, and is then streamed out to random access storage. This enables performing random updates within the segment (such as to the segment length) without the need to seek on random access storage. A typical segment size may be e.g., 8 MB.

Simple Sequential Retrieval

For data retrieval, the archive provides a set of "rules" for how to reconstruct the data. An example for such a rule is "go back to position X in the archive and read Y bytes". An obvious retrieval implementation would require random read access to the archive. This is not a problem if the archive is for example stored on random access storage. However, in order to retrieve from a stream (e.g., tape cartridge in a tape drive), seeking on the stream is undesirable because it is quite slow or it may even be impossible (e.g., network streams).

For decompression, all references can be fulfilled either from the current stream or by referencing data that has already been decompressed. This is because a new data chunk in segment was written to the archive the first time it is encountered. In other words, when reading a segment, the reconstruction metadata either references new data chunks, which are contained in the current segment, or previous data chunks, which have already been read and, therefore, stored in the decompressed output.

Thus, decompression can be implemented as e.g., "Go to file A you have already uncompressed, seek B bytes in and read C bytes". As such, a seek in the archive becomes unnecessary. An optimization involves keeping a table of files allowing "A" to be a short reference number rather than a whole path. File A must always exist. Thus, partial retrieval is not an option in simple sequential retrieval. This is not an issue in some cases, for example, single disk images wherein there is only a single file to decompress. However, such incremental restore is a desiderata for more "tar" like applications.

Complex Sequential Storage

If there is a small amount (e.g., less than 1% of the total storage) of Random Access Storage (RAS) available with a tape-like medium, "Complex Sequential Storage" enables storage of the reconstruction metadata and/or chunk reference table in the RAS. Storing the reconstruction metadata in the RAS enables listing all files contained in the archive without streaming through the sequential access medium (e.g., tape). Additionally, portions of the archive can be "deleted" by removing entries from the reconstruction metadata. Deprecated data chunks in the archive may be replaced when adding additional data. Storing the chunk reference table on the RAS can significantly speed up appends to the archive.

Complex Sequential Retrieval

Complex sequential retrieval benefits from RAS access to the reconstruction metadata and/or chunk reference tables. Random access to the reconstruction metadata allows partial restore, or restores of a small number of files. The decompression process can "scan" through the archive (potentially skipping large sections of it), and still reconstruct the output files. It does so, based on apriori knowledge of when a file references earlier data not included in a partial decompression set. Such data chunks can be read from the sequential storage (e.g., tape) during a single scan because random access to the reconstruction data provides the apriori knowledge. Reading the chunk reference table from the RAS is faster than seeking to the end of the tape during the initialization of appending to the archive.

Enabling Append

Further, adding data to an existing deduplication archive is provided. When appending additional data to an existing archive, an in-memory chunk reference table needs to be restored to allow identification of chunks in the new data already contained in the archive.

This data (i.e., in-memory chunk reference table) is generally not stored in the archive in order to preserve storage space. However, this restriction does not hold when writing the archive to streaming archival storage such as tape if the entire tape is used for a single archive (e.g., IZO archive 19, FIG. 1). As long as the archive does not use the entire tape, the remaining free space can be used to store the chunk reference table. This allows restoration of the in-memory chunk reference table by seeking to the end of the archive and reading the chunk reference table from random access storage (e.g., disk drive), which is then overwritten with the additional data. At the end of the append, the new chunk reference table is written out to enable the next append, unless the tape has been fully used. This process allows efficient appends to the tape archive as long as there is sufficient space remaining on the tape.

If the storage of the chunk reference table is not desired, said data (i.e., in-memory chunk reference table) may be generated by reading the complete archive and recalculating chunk boundaries and their content hashes. Though this approach may be computationally intensive for large archives, it is valuable to note that the chunk reference table can always be reconstructed by processing the data contained in the archive. Performance improvements may be achieved by storing the chunk reference table on the RAS.

Figure 5:
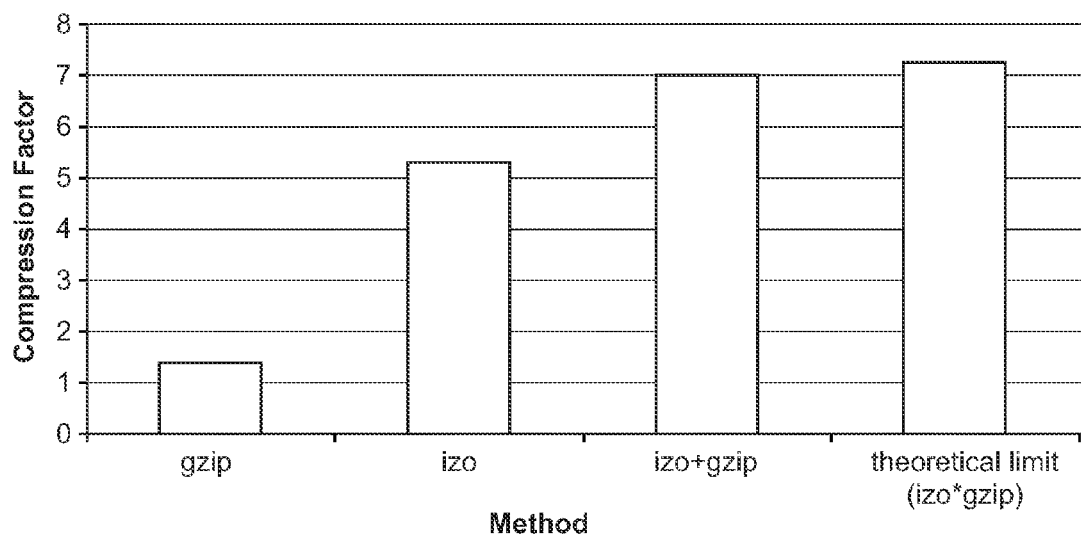
FIG. 5 illustrates an example comparison of compression achieved by different techniques.

A data compression factor achieved with data deduplication is generally complementary to the compression factor achieved using standard short-range compression tools (e.g., gzip). The exact compression ratio depends on the input data, however as shown by example in FIG. 5, the actual compression factor of combination of the disclosed deduplication process (IZO) and gzip approximates a theoretical possible value (i.e., IZO compression factor*gzip compression factor, wherein "*" represents multiplication). As disclosed herein, enabling data deduplication for streaming storage such as tape drives provides additional compression over existing compression mechanisms.

Figure 6:
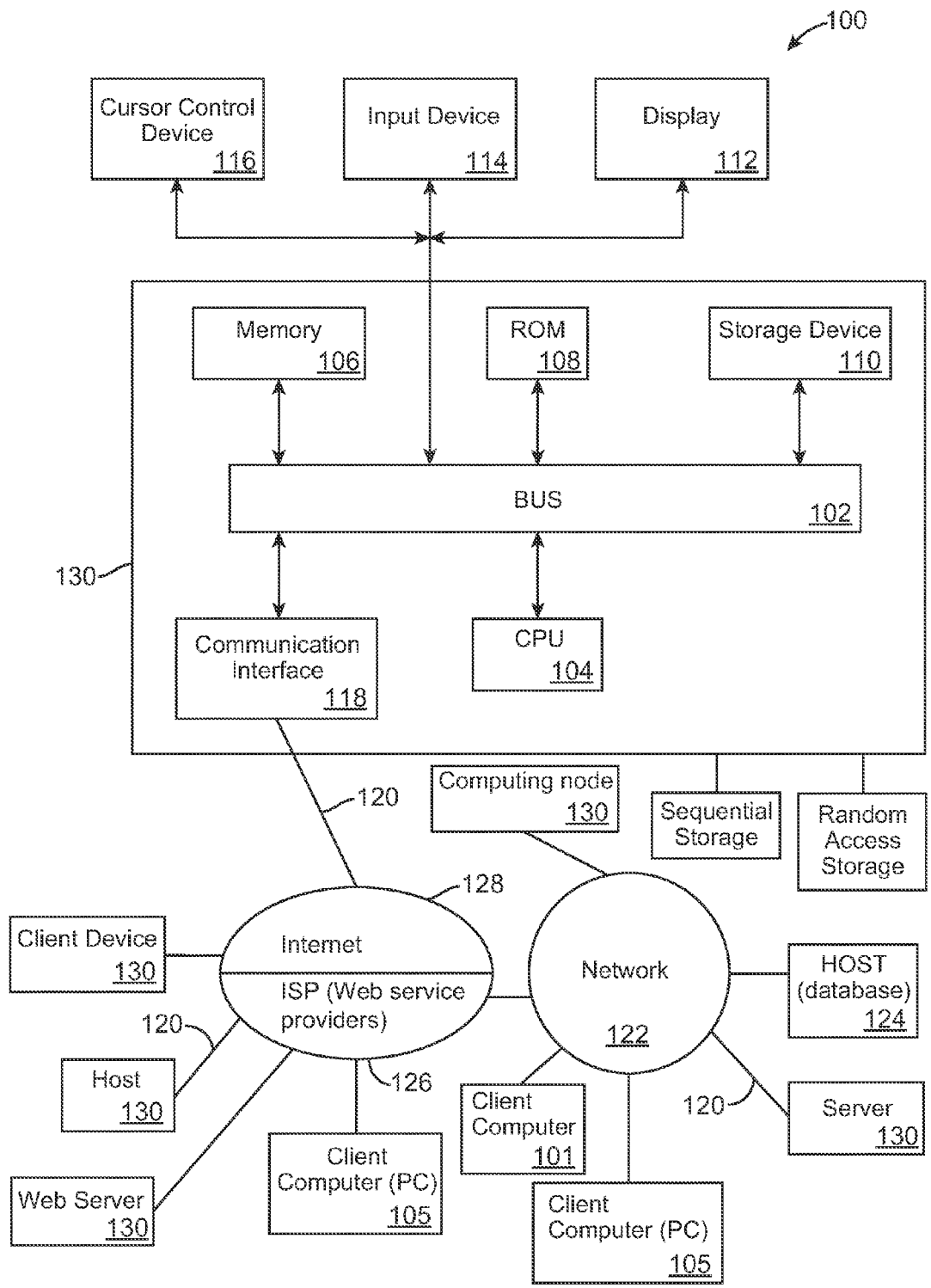
FIG. 6 shows a block diagram of a system in which deduplication for streaming sequential data storage applications may be implemented.

FIG. 6 shows a block diagram of example architecture of an embodiment of a system 100 for implementing an embodiment of the invention. The system 100 includes one or more client devices 101 connected to one or more server computing systems 130. A server 130 includes a bus 102 or other communication mechanisms for communicating information, and a processor (CPU) 104 coupled with the bus 102 for processing information. The server 130 also includes a main memory 106, such as a random access memory (RAM) or other dynamic storage device, coupled to the bus 102 for storing information and instructions to be executed by the processor 104. The main memory 106 also may be used for storing temporary variables or other intermediate information during execution or instructions to be executed by the processor 104. The server computer system 130 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

The server 130 may be coupled via the bus 102 to a display 112 for displaying information to a computer user. An input device 114, including alphanumeric and other keys, is coupled to the bus 102 for communicating information and command selections to the processor 104. Another type of user input device comprises cursor control 116, such as a mouse, a trackball, or cursor direction keys for communicating direction information and command selections to the processor 104 and for controlling cursor movement on the display 112.

According to one embodiment of the invention, the functions of the invention are performed by the server 130 in response to the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also be employed to execute the sequences of instructions contained in the main memory 106. In alternative embodiments, hard-wired circuitry may be used in place of or in combination with software instructions to implement the invention. Thus, embodiments of the invention are not limited to any specific combination of hardware circuitry and software.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104. The server 130 also includes a communication interface 118 coupled to the bus 102. The communication interface 118 provides a two-way data communication coupling to a network link 120 that is connected to the world wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a network 122 via a communication link 120. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126 in turn provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves transporting the information.

The server 130 can send/receive messages and data, including e-mail, program code, through the network, the network link 120 and the communication interface 118. Further, the communication interface 118 can comprise of a USB/Tuner and the network link 120 may be an antenna or cable for connecting the server 130 to a cable provider, satellite provider or other terrestrial transmission system for receiving messages, data and program code from another source.

The example versions of the invention described herein may be implemented as logical operations in a distributed processing system such as the system 100 including the servers 130. The logical operations of the present invention can be implemented as a sequence of steps executing in the server 130, and, as interconnected machine modules, within the system 100. The implementation is a matter of choice and can depend on performance of the system 100 implementing the invention. As such, the logical operations constituting said example versions of the invention are referred to for e.g. as operations, steps or modules.

Similar to a server 130 described above, a client device 101 can include a processor, memory, storage device, display, input device and communication interface (e.g., e-mail interface) for connecting the client device to the Internet 128, the ISP 126, or LAN 122, for communication with the servers 130.

The system 100 can further include computers (e.g., personal computers, computing nodes) 105 operating the same manner as client devices 101, wherein a user can utilize one or more computers 105 to manage data in the server 130.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for data deduplication compression in a streaming storage application, comprising compressing fully sequential data stored in a data repository to a sequential streaming storage, by:
   splitting fully sequential data into data blocks;
   hashing content of each data block and comparing each hash to an in-memory lookup table for a match, the in-memory lookup table storing all hashes that have been encountered during the compression of the fully sequential data;
   for each data block without a hash match, adding the data block as a new data block for compression of fully sequential data;
   encoding duplicate data blocks using the in-memory lookup table into data segments such that both sequential and random access decompression of the data repository are enabled;
   compressing partially sequential data and data from a random access storage stored in a data repository to the sequential streaming storage; and
   decompressing fully and partially sequential data stored on the sequential streaming storage to the data repository
   wherein reconstruction metadata references previous data blocks and new data blocks, the previous data blocks read and stored in a decompressed output, the new data blocks contained in a current data segment.

2. The method of claim 1 wherein the reconstruction metadata and the in-memory lookup table for data from a randomly accessible storage are stored in a random access storage, the reconstruction metadata enabling listing all files contained in a data deduplication archive without streaming through the sequential streaming storage.

3. The method of claim 2 further comprising:
   decompressing data from the random access storage stored on the sequential streaming storage to the data repository by scanning and decompressing the compressed data from the random access storage, and analyzing apriori information to determine when earlier data is going to be referenced, wherein the earlier data is not included in a partial decompression set.

4. The method of claim 3, further comprising:
   appending additional data to the data deduplication archive, wherein the in-memory lookup table is restored by reading the in-memory lookup table to identify data blocks in the additional data contained in the data deduplication archive, such that the in-memory lookup table is overwritten with the additional data; and
   storing a new in-memory lookup table to enable subsequent appending of additional data.

5. The method of claim 4 wherein encoding the duplicate data blocks further comprises referencing the position and length of the original data block in the sequential data stream using the information from the lookup table.

6. The method of claim 5 wherein each data segment encodes the length of the segment, followed by the reconstruction metadata, and followed by a unique data block.

7. A computer program product for data deduplication compression in a streaming storage application, the computer program product comprising:
   a non-transitory computer readable storage medium having computer readable program code embodied therewith, wherein the computer readable program when executed on the computer causes the computer to provide a deduplication archive that enables storage of the archive to, and extraction from, a streaming storage medium by:
   compressing fully sequential data stored in a data repository to a sequential streaming storage, by:
   splitting fully sequential data into data blocks;
   hashing content of each data block and comparing each hash to an in-memory lookup table for a match, the in-memory lookup table storing all hashes that have been encountered during the compression of the fully sequential data;

for each data block without a hash match, adding the data block as a new data block for compression of fully sequential data;

encoding duplicate data blocks using the in-memory lookup table into data segments;

compressing partially sequential data and data from a random access storage stored in a data repository to the sequential streaming storage; and decompressing fully and partially sequential data stored on the sequential streaming storage to the data repository wherein reconstruction metadata references previous data blocks and new data blocks, the previous data blocks read and stored in a decompressed output, the new data blocks contained in a current data segment.

8. The computer program product of claim 7 wherein the reconstruction metadata and the in-memory lookup table for data from the random access storage are stored in the random access storage, the reconstruction metadata enabling listing all files contained in a data deduplication archive without streaming through the sequential streaming storage.

9. The computer program product of claim 8 further comprising computer readable program code for performing:

decompressing data from the random access storage stored on the sequential streaming storage to the data repository by scanning and decompressing the compressed data from the random access storage, and analyzing apriori information to determine when earlier data is going to be referenced, wherein the earlier data is not included in a partial decompression set.

10. The computer program product of claim 9 further comprising computer readable program code for performing:

appending additional data to the data deduplication archive, wherein the in-memory lookup table is restored by reading the in-memory lookup table to identify data blocks in the additional data contained in the data deduplication archive, such that the in-memory lookup table is overwritten with the additional data; and storing a new in-memory lookup table to enable subsequent appending of additional data.

11. The computer program product of claim 10 further comprising computer readable program code for performing:

encoding the duplicate data block by referencing the position and length of the original data block in the sequential data stream using the information from the lookup table.

12. The computer program product of claim 11 wherein each data segment encodes the length of the segment, followed by the reconstruction metadata, and followed by a unique data block.

13. A data deduplication compression system for a streaming storage application, comprising a deduplication module configured for compressing fully sequential data stored in a data repository to a sequential streaming storage, the deduplication module comprising:

a deduplication compression module employing a hardware processor for:

splitting fully sequential data into data blocks;

hashing content of each data block and comparing each hash to an in-memory lookup table for a match, the in-memory lookup table storing all hashes that have been encountered during the compression of the fully sequential data;

for each data block without a hash match, adding the data block as a new data block for compression of fully sequential data; and encoding duplicate data blocks using the in-memory lookup table into data segments;

a short-range compression module for:

compressing partially sequential data and data from a random access storage stored in a data repository to the sequential streaming storage; and a short-range decompression module for:

decompressing fully and partially sequential data stored on the sequential streaming storage to the data repository;

wherein reconstruction metadata references previous data blocks and new data blocks, the previous data blocks read and stored in a decompressed output, the new data blocks contained in a current data segment.

14. The system of claim 13 wherein the reconstruction metadata and the in-memory lookup table for data from the random access storage are stored in the random access storage, the reconstruction metadata enabling listing all files contained in a data deduplication archive without streaming through the sequential streaming storage.

15. The system of claim 13 wherein the deduplication module further comprises a deduplication decompression module configured for:

decompressing data from the random access storage stored on the sequential streaming storage to the data repository by scanning and decompressing the compressed data from the random access storage, and analyzing apriori information to determine when earlier data is going to be referenced, wherein the earlier data is not included in a partial decompression set.

16. The system of claim 15, wherein the deduplication module is further configured for:

appending additional data to the data deduplication archive, wherein the in-memory lookup table is restored by reading the in-memory lookup table to identify data blocks in the additional data contained in the data deduplication archive, such that the in-memory lookup table is overwritten with the additional data; and storing a new in-memory lookup table to enable subsequent appending of additional data.

17. The system of claim 16 wherein the data deduplication module is further configured for encoding the duplicate data block by referencing the position and length of the original data block in the sequential data stream using the information from the lookup table.

* * * * *